United States Patent
Theobald (10) Patent No.: US 10,702,986 B2
(45) Date of Patent: Jul. 7, 2020

(54) ORDER PICKING METHOD AND MECHANISM

(71) Applicant: Vecna Robotics, Inc., Waltham, MA (US)

(72) Inventor: Daniel Theobald, Somerville, MA (US)

(73) Assignee: VECNA ROBOTICS, INC., Waltham, MA (US)

( * ) Notice: Subject to any disclaimer, the term of this patent is extended or adjusted under 35 U.S.C. 154(b) by 0 days.

(21) Appl. No.: 16/720,216

(22) Filed: Dec. 19, 2019

(65) Prior Publication Data

US 2020/0122319 A1    Apr. 23, 2020

Related U.S. Application Data

(63) Continuation of application No. 16/055,631, filed on Aug. 6, 2018, now Pat. No. 10,513,030, which is a continuation of application No. 14/608,309, filed on Jan. 29, 2015, now Pat. No. 10,040,194.

(51) Int. Cl.
| | |
|---|---|
| *G06F 7/00* | (2006.01) |
| *B25J 9/16* | (2006.01) |
| *B25J 19/04* | (2006.01) |
| *B25J 19/02* | (2006.01) |
| *B25J 5/00* | (2006.01) |

(52) U.S. Cl.
CPC . *B25J 9/16* (2013.01); *B25J 5/00* (2013.01); *B25J 19/02* (2013.01); *B25J 19/04* (2013.01); *Y10S 901/01* (2013.01); *Y10S 901/02* (2013.01); *Y10S 901/47* (2013.01)

(58) Field of Classification Search
None
See application file for complete search history.

(56) References Cited

U.S. PATENT DOCUMENTS

| | | | |
|---|---|---|---|
| 5,397,134 A | 3/1995 | Fishman | |
| 6,598,881 B1 | 7/2003 | Shoemaker, Jr. | |
| 7,334,798 B2 | 2/2008 | Halliburton | |
| 7,610,115 B2 | 10/2009 | Rob | |
| 7,841,599 B2 | 11/2010 | Todokoro | |
| 8,060,248 B1 | 11/2011 | Boyer | |
| 9,073,215 B2 | 7/2015 | Nagata | |
| 9,089,969 B1 | 7/2015 | Theobald | |
| 9,205,558 B1 * | 12/2015 | Zevenbergen | B25J 9/1664 |
| 10,040,194 B1 * | 8/2018 | Theobald | B25J 9/0087 |
| 2002/0152141 A1 | 10/2002 | Carter | |
| 2003/0146233 A1 | 8/2003 | Chirnomas | |

(Continued)

*Primary Examiner* — Yolanda R Cumbess (57) ABSTRACT

A method and mechanism for picking at least one item is provided. The method includes providing at least one container, the container at least containing a plurality of substantially the same items randomly arranged within the container, providing at least one mechanism for collecting at least one item from the container, enabling the mechanism to roughly determine the position of the mechanism with respect to the items in the container utilizing the least amount of power, moving the mechanism so that it is at least in close proximity to the items in the container, collecting at least one item in the container with the mechanism, moving the mechanism and the collected at least one item at least a predetermined distance away from the remaining non-collected items in the container and determining the number of items collected by the mechanism utilizing the least amount of power.

20 Claims, 7 Drawing Sheets

(56) References Cited

U.S. PATENT DOCUMENTS

| | | |
|---|---|---|
| 2005/0143857 A1 | 6/2005 | Chirnomas |
| 2007/0013139 A1 | 1/2007 | Kumagai |
| 2007/0264106 A1 | 11/2007 | Van der Meulen |
| 2010/0004778 A1 | 1/2010 | Arimatsu |
| 2012/0017507 A1* | 1/2012 | Owens, Jr. ............ A01G 9/143 47/1.01 P |
| 2014/0123606 A1* | 5/2014 | Ehrat ................... B65B 5/105 53/473 |
| 2015/0127162 A1* | 5/2015 | Gotou ................... B25J 9/1612 700/259 |

* cited by examiner

ORDER PICKING METHOD AND MECHANISM

PRIORITY INFORMATION

The present application is a continuation of U.S. patent application Ser. No. 16/055,631, filed Aug. 6, 2018, which is a continuation of U.S. patent application Ser. No. 14/608,309, filed Jan. 29, 2015. The contents of which are incorporated herein by reference in their entirety.

BACKGROUND OF THE INVENTION

1. Field of the Invention

The present invention generally relates to order or item picking methods and mechanisms.

2. Introduction

Mechanisms such as robots or the like may be used to pick a desired number of items. Often times, however, these mechanisms are very complex and may require complex sensor devices or the like to determine the size and position of one or more items in order to collect or grasp the items which may increase power consumption as well as the time required to accomplish the pick or other task.

SUMMARY

A method and mechanism for picking at least one item is provided. The method includes providing at least one container, the container at least containing a plurality of substantially the same items randomly arranged within the container, providing at least one mechanism for collecting at least one item from the container, enabling the mechanism to roughly determine the position of the mechanism with respect to the items in the container utilizing the least amount of power, moving the mechanism so that it is at least in close proximity to the items in the container, collecting at least one item in the container with the mechanism, moving the mechanism and the collected at least one item at least a predetermined distance away from the remaining non-collected items in the container and determining the number of items collected by the mechanism utilizing the least amount of power.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DETAILED DESCRIPTION

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention generally relates to order or item picking methods and mechanisms. Such mechanisms may be configured as a part of a robot, vehicle or the like to pick various types of items. Often times, however, these mechanisms may need to pick a specific, desired number of items.

To collect, grasp or gather one or more items existing mechanisms may use advanced computer vision tools to determine the precise position and/or orientation of the items before grasping them. These computer vision analysis tools, however, may be difficult to develop, costly to implement, and lead to increased power consumption along with increased time to complete the picking or task at hand. Additionally, these computer vision analysis tools may be inaccurate due to occlusion and different appearances of the items.

The mechanism in accordance with the invention, on the other hand, doesn't need to grasp items individually or require computer vision analysis tools to grasp a precise desired number of items. The mechanism in accordance with the invention also does not require items to be in a specific position or orientation to collects one or more items.

Rather, the mechanism in accordance with the invention may repeatedly collect or grasp a random number of items from a first location that contains a plurality of items (i.e., a box, a bin, container, pallet, or the like, hereinafter "container"). After the mechanism grasps a random number of items, the number of items grasped may be determined.

If the number of items grasped is not equal to a desired number of items, the mechanism may place the grasped items back into the container. The mechanism may then again grasp a random number of items.

This process may be repeated until the mechanism grasps the desired number of items. Once the mechanism grasps the desired number of items, the items may then be transported or otherwise moved to a second location, if desired.

The features of the invention therefore enable the mechanism to determine the general location of items and to quickly pick a desired number of items. As the mechanism isn't required to use complex image analysis techniques or grasp items individually, power and time consumption are minimized.

The features of the present invention represent a significant shift away from existing art. As stated previously, existing mechanisms may aim for a high degree of precision to grasp a desired number of items in a single attempt. This may lead to increased time of operation (e.g., due to any image processing delays) and increased power consumption.

Although the mechanism of the present invention may require more than one attempt to grasp the desired number of items, the grasping attempts may be performed quickly (e.g., at least one grasp/release cycle per second). As the mechanism may perform these grasping attempts quickly, the mechanism will more likely grasp the desired number of items in a short amount of time and therefore minimize power consumption.

The features of the invention may be advantageous in applications such as warehouse environments for shipping/receiving items. In this type of application, items frequently need to be gathered from one container or location and transported to other containers for storage, use, or further shipment.

For example, in a warehouse environment, items may be located on various containers throughout the warehouse. A mechanism (or a vehicle configured with the mechanism) may be tasked to travel throughout the warehouse to pick certain items. The mechanism may gather these items from their respective containers and place them on the vehicle which may then transport these items to another container, if desired.

Similarly, military and other shipping services may benefit from the features of the invention, as well as any other type of operations in which items need to be picked and/or moved from and to certain areas. Other types of logistic operations may include applications in health care facilities, hospitality resorts, restaurants, correctional facilities, academic buildings, and retail stores. This list is merely exemplary, and applicant contemplates a wide variety of applications that may benefit from the features of the invention.

Figure 1:
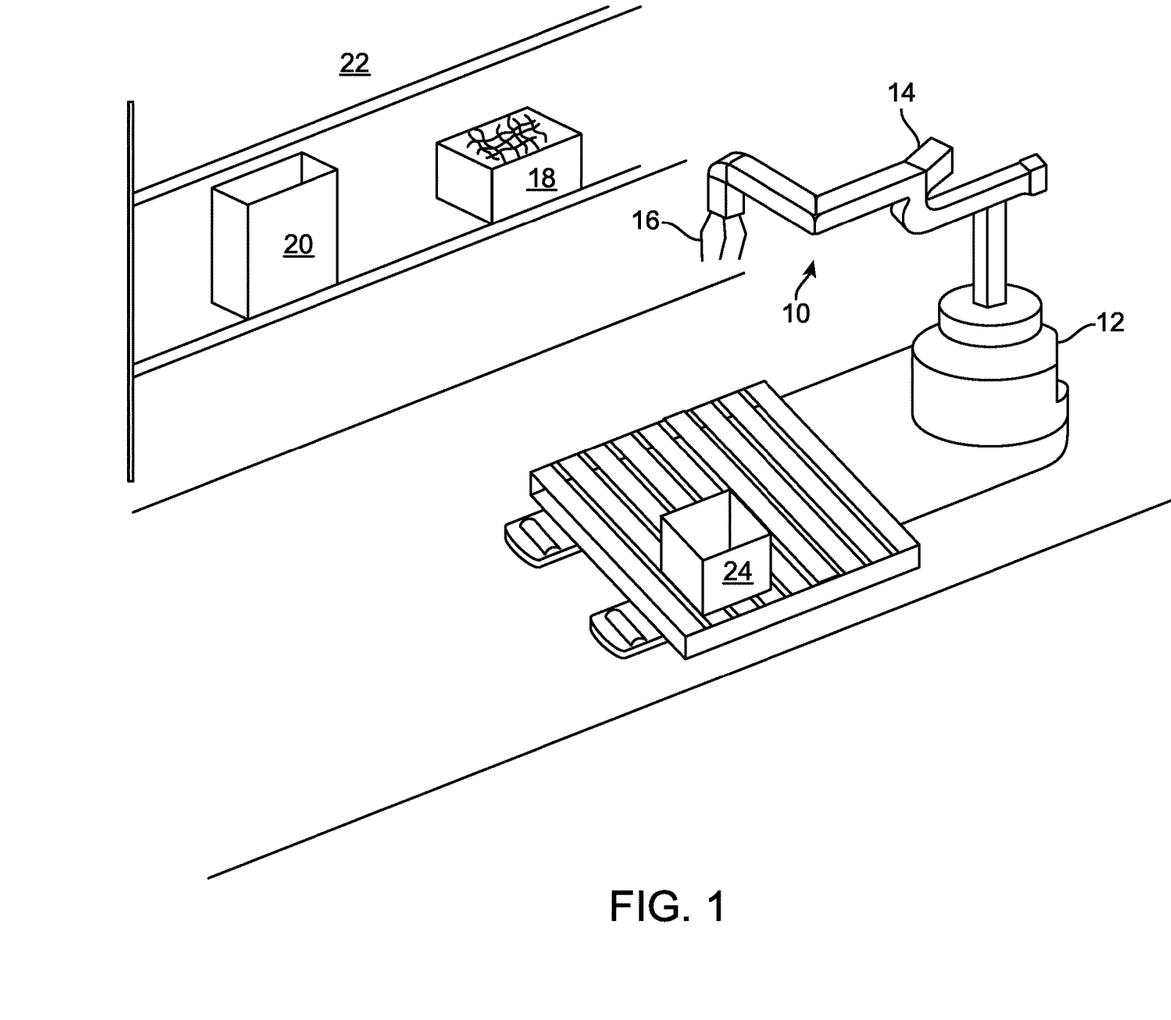
FIG. 1 generally illustrates the mechanism configured as part of a vehicle in accordance with one embodiment of the invention.

FIG. 1 generally illustrates one configuration of the mechanism 10 in which the mechanism 10 is configured as part of a vehicle 12. In this configuration, the mechanism 10 may be in the form of a robotic arm member 14 operably attached to the vehicle 12 and include an end effector 16, illustrated as a claw-like device.

Briefly, in operation, the mechanism 10 may be tasked to pick a desired number of items from a first container such as a box 18 or 20 that may be located on a shelf 22. The mechanism 10 may first travel to the box 18 that contains the desired items.

Once near the box 18 containing the desired items, the mechanism 10 may "reach" into the box 18 to grasp a random number of items. For example, the end effector 16 may be lowered into the box 18 in an "open" position and, once in the box 18, move to a "closed" position, thereby grasping a random number of items. The mechanism 10 may then move away from the items.

Once these items are grasped, the mechanism 10 may determine the number of items grasped. If the number of items grasped is not equal to the desired number of items, the mechanism 10 may simply release the grasped items or otherwise place the items back into the box 18 and try again. This process may be repeated until the mechanism 10 gathers the desired number of items.

Once the mechanism 10 grasps the desired number of items, the mechanism 10 may then place the items in a second container, such as in a box 24 on the vehicle 12. The vehicle 12 may then transport the grasped items to another container for further shipment, use, storage, or the like.

Figure 2:
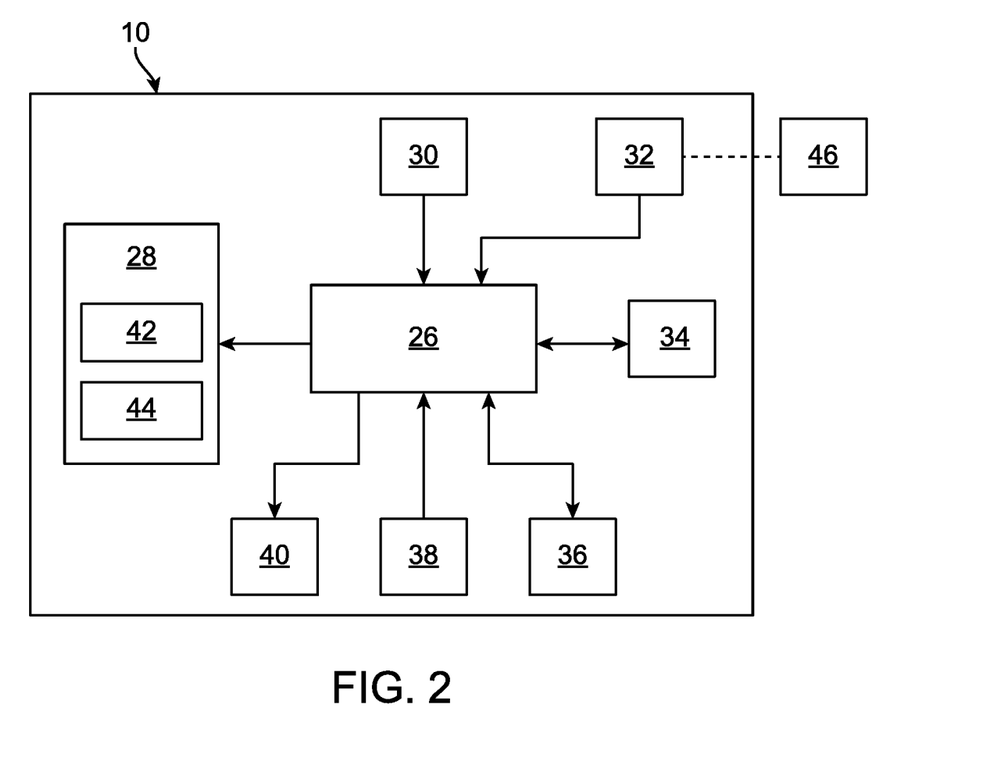
FIG. 2 generally illustrates a block diagram of the mechanism in accordance with one embodiment of the invention.

FIG. 2 generally illustrates a block diagram of the mechanism 10 in accordance with one embodiment of the invention. The mechanism 10 may include a control device 26 implemented using hardware or a combination of hardware and software to perform any necessary calculations and to control operation of the mechanism 10. The control device 26 may include one or more processing devices, analog and/or digital circuitry, and be in operable communication with other components such as a manipulator system 28, sensor system 30, transceiver element 32, memory 34, an interface 36, a power source 38, and a mobility platform 40.

The manipulator system 28 may include at least one manipulator 42 such as a robot arm or the like. The manipulators may be electronically, hydraulically, pneumatically and/or mechanically actuated and may include an end effector device 44 to grasp items, such as a gripping device, a suction device, an electromagnet, a winch, a clasp, or the like.

The sensor system 30 may include any type of sensor device that can gather information regarding the number of items grasped by the mechanism 10. For example, the sensor system 30 may include the cameras described in detail in applicant's allowed patent application Ser. No. 12/626,990, entitled "System for Providing Camera Views" the disclosure of which is hereby incorporated by reference.

The sensor system 30 may also include global positioning system (GPS) sensors, 3D cameras (e.g., LIDAR), infrared cameras, stereoscopic cameras, inertial sensors, odometric sensors, radar, electro-acoustic transducers (microphones), or other types of devices that assist the mechanism 10 in surveying and navigating within its environment. The number of, type of, and positions of the sensor devices of the sensor system 30 may vary as long as the features of the invention can be accomplished.

The sensor system 30 may also include a sensor device that determines the weight of the grasped items. This may be one of many techniques used for determining the number of items grasped in each grasp attempt.

For example, suppose the mechanism 10 is tasked with picking five of a certain type of item. The mechanism 10 may know beforehand that each of these types of items weigh four ounces individually. After each grasp attempt, the mechanism 10 may determine the combined weight of the grasped items.

If the grasped items weigh, say, thirty-two (32) ounces, the mechanism 10 will know that it grasped too many items. The mechanism 10 may then place the items back into the first container and try again. This process may be repeated until the mechanism 10 grasps the desired number of items.

Similarly, if the grasped items weigh twelve (12) ounces, the mechanism 10 will know that it did not grasp enough items. The mechanism 10 may then place the grasped items back into the first container and try again. This process may be repeated until the mechanism 10 grasps the desired number of items.

To gather information regarding the number of items grasped, the mechanism 10 may also rely on applicant's advanced computer vision and analysis tools. These tools may include those described in applicant's pending application Ser. No. 14/264,289 entitled, "Method of Operating a Sensor System," filed Apr. 29, 2014, the contents of which are incorporated by reference.

For example, the mechanism 10 may use model-free methods which may include background subtraction and motion segmentation which rely on changes (e.g., pixel differentiation) to identify individual items grasped. Model-based methods may also be used, which employ off-line trained entity detectors for certain entities as well as different appearances (e.g., due to different viewpoints, occlusion) of the items.

These types of sensor devices of the sensor system 30 may also be positioned remotely from the mechanism 10. For example, sensor devices may be operably positioned throughout the mechanism's working environment proximate to where the mechanism 10 is to grasp the items (e.g., such as on shelves in a warehouse, if applicable).

The sensor system 30 and the items may also be configured with RFID technology. Each item may be configured with an RFID tag which may be read after the items are grasped to determine the number of items grasped.

Although not required, it is contemplated the mechanism may eventually rely on the computer vision and analysis and/or RFID tools to determine the precise locations of items before the mechanism grasps the items. For example, the mechanism may switch to using the vision analysis tools after a predetermined number of grasp attempts to at least assist in grasping the desired number of items more quickly.

The transceiver element 32 may receive commands regarding the mechanism's operation (e.g., a command to pick a desired number of a certain item) via a wireless connection from a remote control device 46. These commands may be issued autonomously or by an operator.

The memory 34 may be configured to store software such as instructions for execution by the control device 26. The memory 34 may include volatile and/or non-volatile memory, and may also be configured to store information regarding the mechanism's surrounding environment such as where certain items are located, their weight, or the like.

An interface 36 may be configured as part of the mechanism 10 and directly receive instructions or commands from an operator. The interface 36 may include an input/output (I/O) device such as a display screen or a touch pad, in which an operator may input task assignments and/or instructions regarding a desired number of items to be grasped.

The power source 38 may be configured to supply power to the control device 26 and other components of the mechanism 10. The power source 38 may include, for example, a battery or a series of batteries, rechargeable batteries, battery packs, or the like.

The mobility platform 40 may enable movement of the mechanism 10, if necessary. For example, if the mechanism is configured as part of a vehicle, the mobility platform 40 may include sets of wheels, motorized track portions, or the like, and may depend on the configuration of the vehicle.

Figure 3:
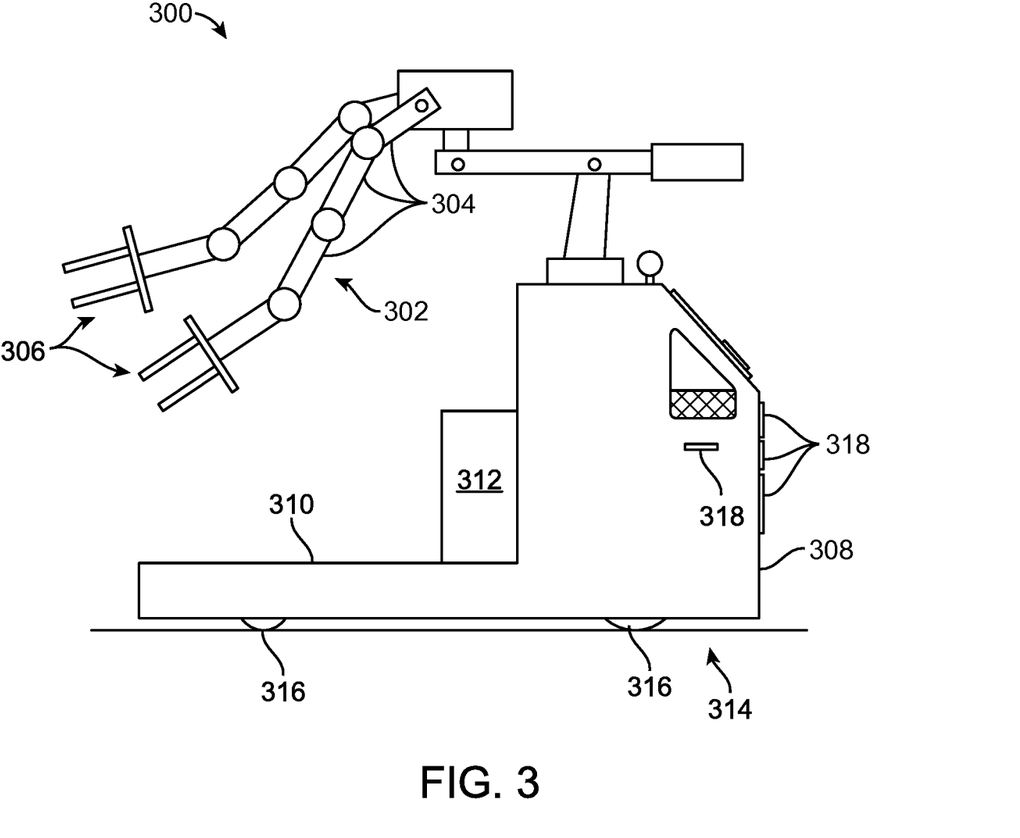
FIG. 3 generally illustrates the mechanism in accordance with one embodiment of the invention.

FIG. 3 generally illustrates a side view of a vehicle 300 in accordance with one embodiment of the invention. In this embodiment, the vehicle 300 may include one or more mechanisms 302 each with one or more arm members 304. The arm members 304 may be electronically, hydraulically, pneumatically and/or mechanically actuated and may include an end effector device 306 such as a gripping device, a suction device, an electromagnet, a winch, a clasp, or the like.

The vehicle 300 may also include a base portion 308 containing the necessary electrical components, mechanical components, connections, and control devices for the vehicle's operation. The base portion 308 may also include a substantially flat portion 310 for supporting an item storage device 312, and also a mobility platform 314 in the form of wheels 316 for enabling movement of the vehicle 300. The vehicle 300 may also include a plurality of sensor devices 318 for gathering information regarding the environment, including the number of items the mechanism grasps.

The mechanism 10 doesn't need to be configured as part of a vehicle, though. For example, FIG. 4 generally illustrates a mechanism 410 near a plurality of containers 412 that may each contain different types of items 414 (or the same type of items).

Figure 4:
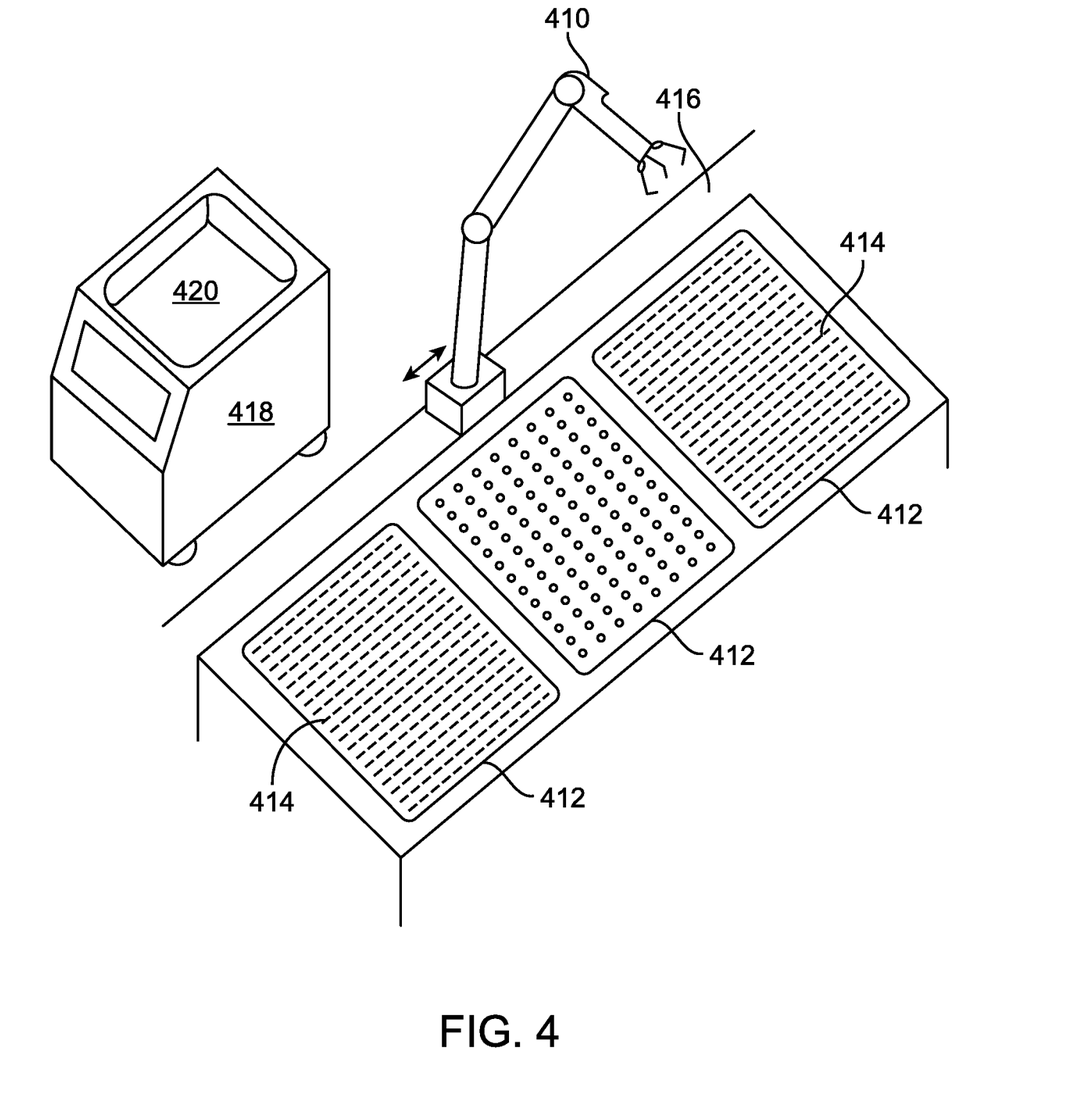
FIG. 4 generally illustrates the mechanism in accordance with another embodiment of the invention.

The mechanism 410 may be movable along a track portion 416, or may be stationary on the track portion 416 as long as the mechanism 410 can grasp the items as desired. Once the desired number of items are grasped, the mechanism 410 may place them on a vehicle 418 traveling nearby. Specifically, the mechanism 410 may place the items on a second container 420 or another location on or with the vehicle 418.

Or, depending on the environment, the mechanism 410 may place the items on a conveyor belt to be transported to another location within the environment. The mechanism may also give the items to an operator.

Figure 5:
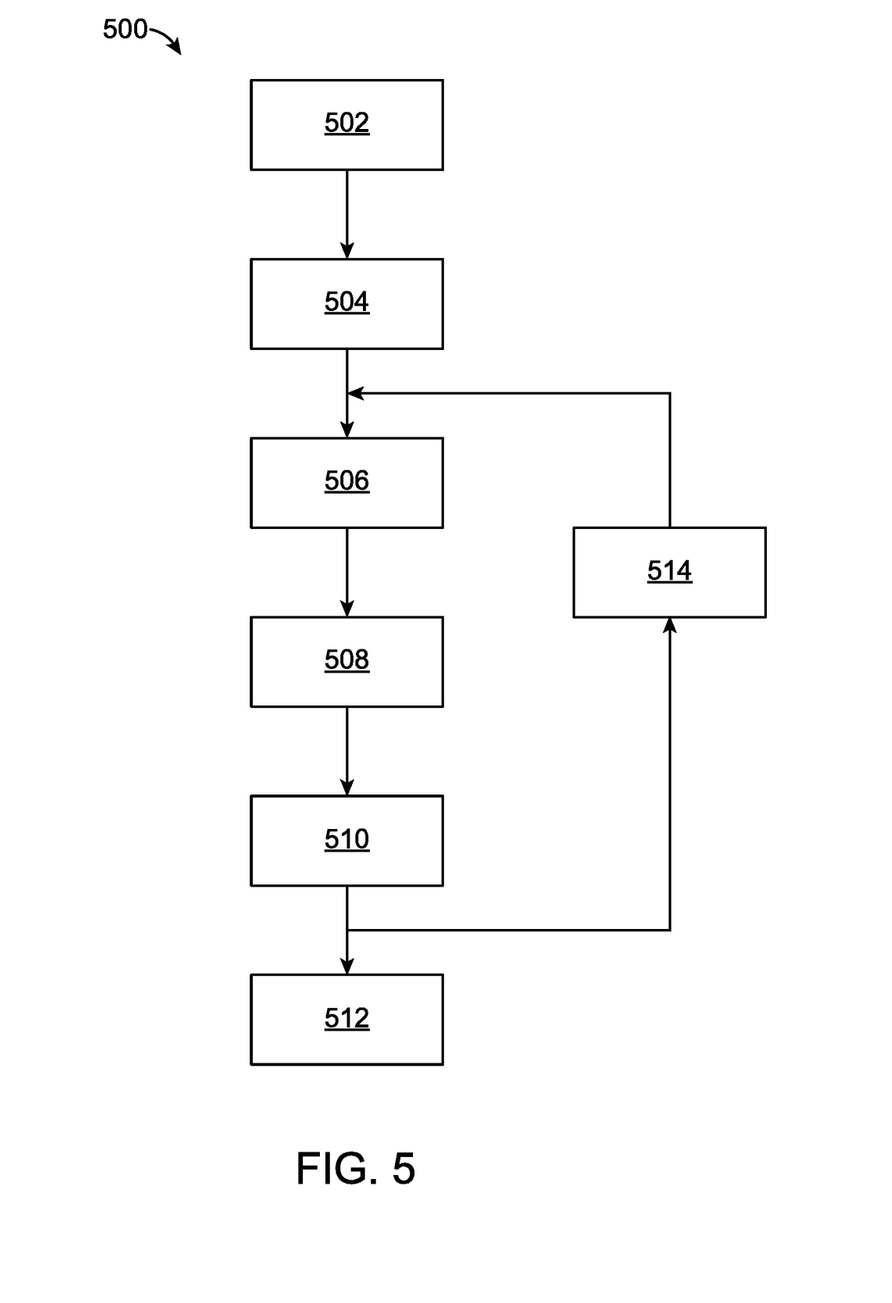
FIG. 5 generally illustrates a method of operating the mechanism to pick at least one item in accordance with one embodiment of the invention.

FIG. 5 generally illustrates a flow chart of a method 500 of operating the mechanism to pick at least one item. In step 502, the mechanism may be tasked with picking a desired number of items. A human operator may assign this task or the task may be assigned autonomously through a remote control device.

In step 504, the mechanism may travel to a first container where the items are located. This step may not be necessary, however, if the mechanism is already in a location proximate to the first container such that the mechanism is able to grasp the items.

In step 506, and once the mechanism is at a position proximate to the first container, the mechanism may grasp a random number of items from the first container. The mechanism may essentially "reach" into the first container a certain distance and at least attempt to grasp a random number of items.

In step 508 the mechanism may then move away from the items in the container. The mechanism 508 isn't required to move a certain predetermined distance away from the items or the container, but should just be able to determine the number of items grasped.

In step 510, the number of items grasped may be determined. As stated previously, this number may be determined by using Applicant's advanced vision analysis, RFID devices, the weight of the grasped items, by a human operator, or by any other technique whether available now or invented hereafter as long as the number of items grasped may be determined.

If the mechanism grasped the desired number of items, in step 512 the mechanism may move, transport, or otherwise place the grasped items in at least a second location. This second location may be on a vehicle, for example, at which point the vehicle may transport the items to another location for further use, shipment, or the like, if desired.

If, on the other hand, the number of grasped items is not equal to the desired number of items, the mechanism may release the items back to the first container in step 514 and then repeat steps 506 through 510. That is, the mechanism may again grasp a random number of items, move away from the items in the container, and the number of grasped items may be determined. This process may be repeated until the mechanism grasps a desired number of items, at which point the mechanism proceeds to step 512.

Figure 6:
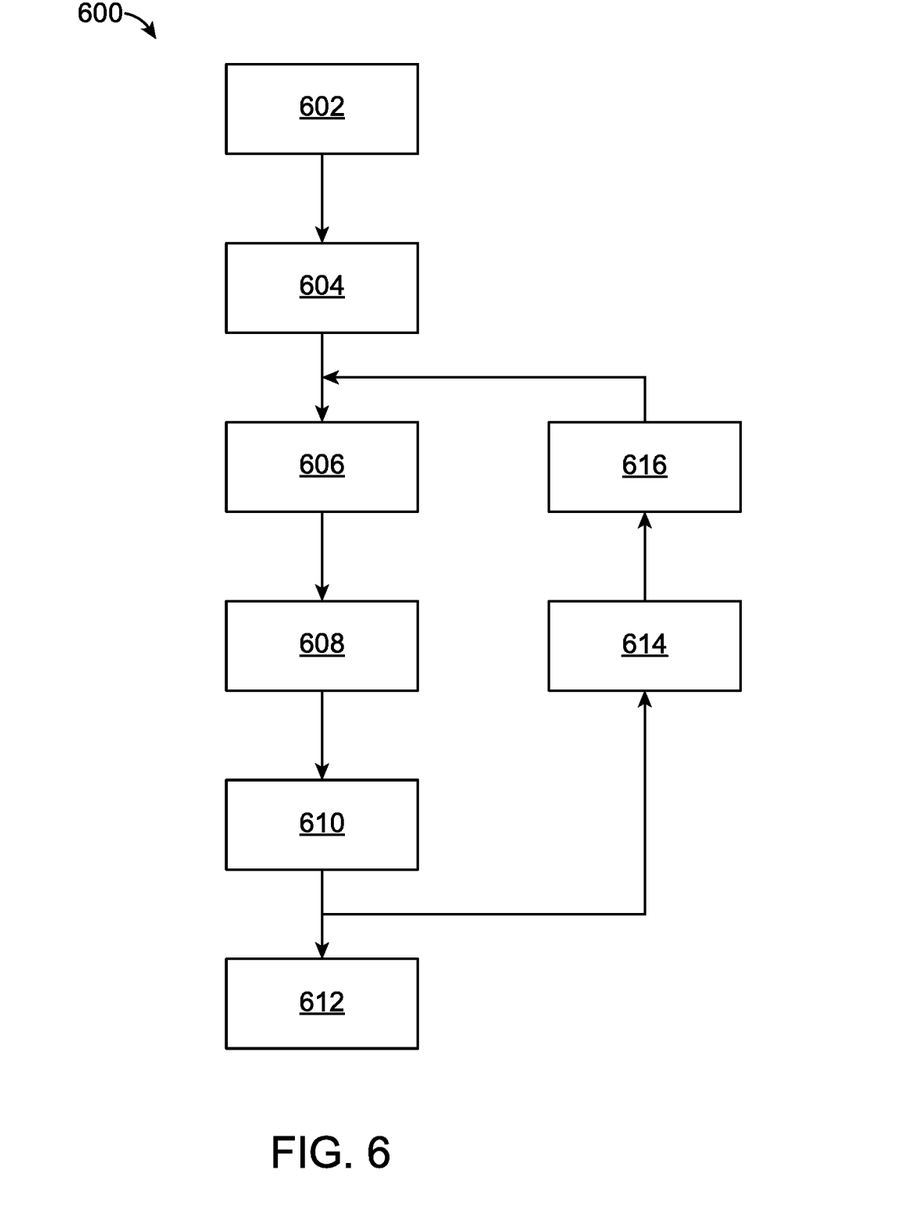
FIG. 6 generally illustrates a method of operating the mechanism to pick at least one item in accordance with another embodiment of the invention.

FIG. 6 generally illustrates a flow chart of another method 600 of operating the mechanism to pick at least one item. Steps 602 through 610 of FIG. 6 may be similar to steps 502 through 510 of FIG. 5, respectively.

If the mechanism grasped the desired number of items, in step 612 the mechanism may move, transport, or otherwise place the grasped items in at least a second location. This second location may be on a vehicle, for example, at which point the vehicle may transport the items to another location for further use, shipment, or the like, if desired.

If, on the other hand, the mechanism did not grasp the desired number of items, the mechanism may release the grasped items back to the first container in step 614. In step 616, the mechanism may then adjust its item grasping technique to at least increase the likelihood of grasping the desired number of items.

For example, in step 616, if the mechanism includes a claw-like device, the mechanism may change the size of the claw's grasp before grasping items again. That is, if the mechanism grasped too many items in a previous attempt, then the claw may attempt to grasp items with a smaller grasp.

Another way the mechanism may adjust its item grasping technique is to change its position with respect to the first container. For example, if the mechanism did not grasp enough items, the mechanism may grasp a random number of items from a different area of the first container (e.g., if there are more items in this area of the first container) or may be lowered into the container a different distance, if applicable. This process may be repeated until the mechanism grasps a desired number of items, at which point the mechanism proceeds to step 612.

Figure 7:
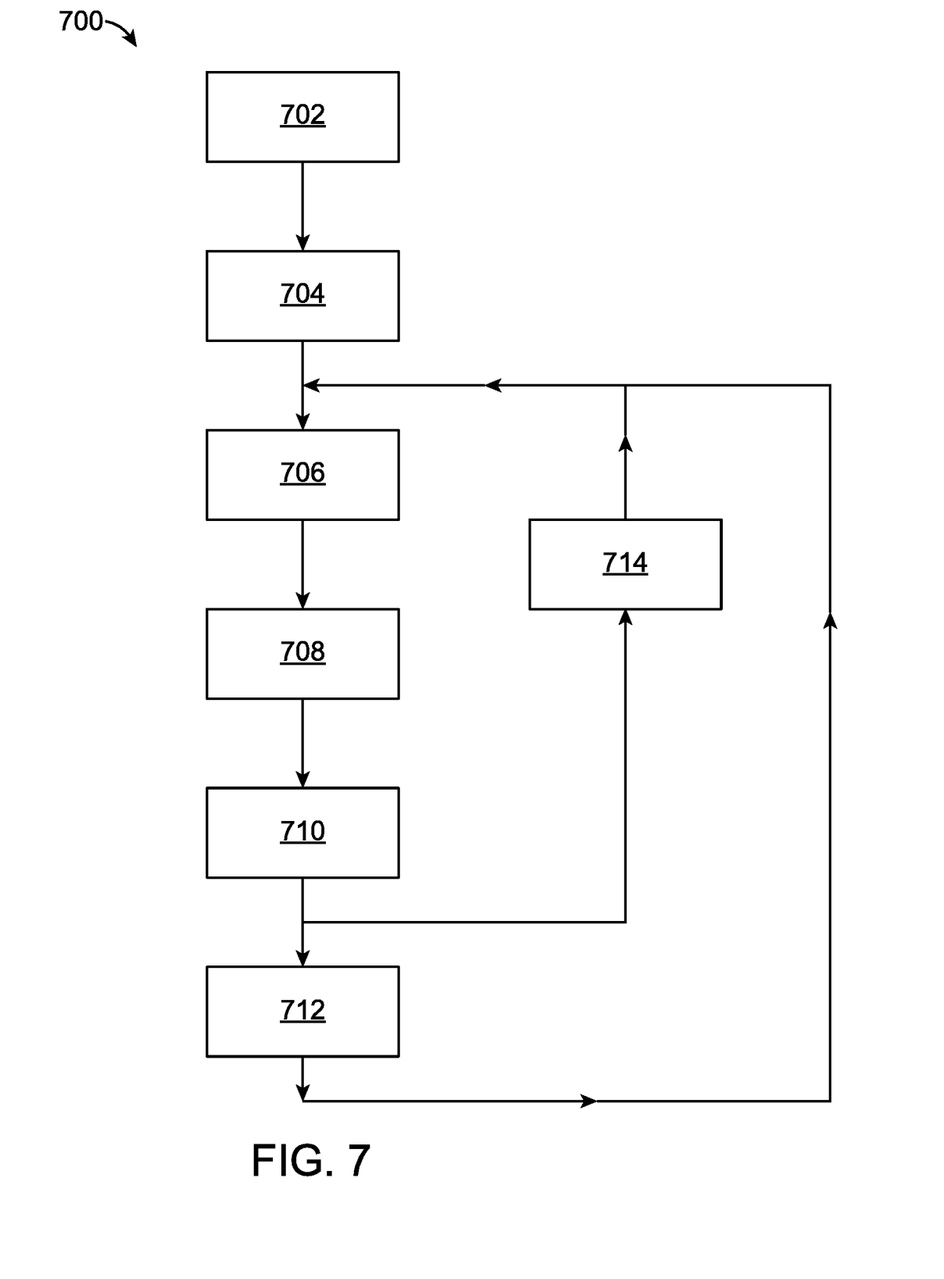
FIG. 7 generally illustrates a method of operating the mechanism to pick at least one item in accordance with another embodiment of the invention.

FIG. 7 generally illustrates a flow chart of another method 700 of operating the mechanism to pick at least one item. Steps 702 through 710 of FIG. 7 may be similar to steps 502 through 510 of FIG. 5, respectively.

If the mechanism grasped the desired number of items, in step 712 the mechanism may move, transport, or otherwise place the grasped items in at least a second container. This second container may be on a vehicle, for example, at which point the vehicle may transport the items to another container for further use, shipment, or the like, if desired.

If the mechanism grasped less than the desired number of items, the mechanism may nonetheless place the items in the second container in step 712. The mechanism may then repeat steps 706 through 710, but this time the mechanism will be attempting to grasp a different number of items as it already grasped a portion of the desired number of items in the previous attempt. It is also contemplated that the mechanism may adjust its item grasping technique (as in step 616 of FIG. 6).

If, on the other hand, the mechanism grasped more than the desired number of items, the mechanism may release the grasped items back to the first container in step 714. The mechanism may then repeat steps 706 through 710 until the mechanism grasps the desired number of items.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A robot comprising:
a processor;
a manipulator; and
a computer-readable storage device storing instructions which, when executed by the processor, cause the processor to control the manipulator to perform operations comprising:
moving the manipulator through an open top of a container and grasping one or more items in the container with the manipulator without any assistance from an individual or other mechanism, to yield grasped items;
moving the manipulator and the grasped items to a position just above the open top of the container; and
moving the grasped items to another area via the manipulator when a number of the grasped items corresponds to a predetermined number of items as detected by a sensor.

2. The robot of claim 1, wherein a computer-readable storage devices stores further instructions which, when executed by the processor, cause the processor to perform operations comprising:
returning the grasped items back to the container when the number of the grasped items by the manipulator does not correspond to the predetermined number of items.

3. The robot of claim 2, wherein the computer-readable storage device stores further instructions which, when executed by the processor, cause the processor to perform operations comprising:
after returning the grasped items back to the container, retrieving second grasped items by repeating the operations of:
moving the manipulator through the open top of the container and grasping one or more other items in the container with the manipulator without any assistance from an individual or other mechanism, to yield the second grasped items;
moving the manipulator and the second grasped items to a position just above the open top of the container and remaining items in the container; and
moving the second grasped items to another area via the manipulator when a number of the second grasped items corresponds to the predetermined number of items.

4. The robot of claim 1, wherein the robot comprises a mobile robot.

5. The robot of claim 1, wherein the manipulator comprises at least one of a gripping device, a suction device, and electromagnet, a winch, or a clasp.

6. The robot of claim 1, wherein the sensor comprises at least one of a global positioning system sensor, a 3D camera, an infrared camera, a stereoscopic camera, an inertial sensor, and odor, metric sensor, a radar, or an electro-acoustic transducer.

7. A system comprising:
a processor;
a robot having a manipulator, the manipulator being separate from a container, the manipulator being used for grasping items in the container;
a sensor configured with the system; and
a computer-readable storage device storing instructions which, when executed by the system, cause the robot to perform operations comprising:
moving the manipulator through an open top of the container and grasping one or more items in the container with the manipulator without any assistance from an individual or other mechanism, to yield grasped items;
moving the manipulator and the grasped items to a position just above the open top of the container; and
moving the grasped items to another area via the manipulator when a number of the grasped items corresponds to a predetermined number of items as detected by the sensor.

8. The system of claim 7, wherein the computer-readable storage device stores further instructions which, when executed by the system, cause the system to perform operations comprising:
returning the grasped items back to the container when the number of the grasped items does not correspond to the predetermined number of items.

9. The system of claim 8, wherein the computer-readable storage device stores further instructions which, when executed by the system, cause the system to perform operations comprising:
after returning the grasped items back to the container, retrieving second grasped items by repeating the operations of:
moving the manipulator through the open top of the container and grasping one or more other items in the container with the manipulator without any assistance from an individual or other mechanism, to yield the second grasped items;
moving the manipulator and the second grasped items to a position just above the open top of the container and remaining items in the container; and
moving the second grasped items to another area via the manipulator when a number of the second grasped items corresponds to the predetermined number of items.

10. The system of claim 7, wherein the robot comprises a mobile robot.

11. The system of claim 7, wherein the manipulator comprises at least one of a gripping device, a suction device, and electromagnet, a winch, or a clasp.

12. The system of claim 7, wherein the sensor comprises at least one of a global positioning system sensor, a 3D camera, an infrared camera, a stereoscopic camera, an inertial sensor, and odor, metric sensor, a radar, or an electro-acoustic transducer.

13. The system as defined in claim 7, wherein the computer-readable storage device stores further instructions which, when executed by the system, cause the system to perform operations comprising:
returning the grasped items back to the container when the number of grasped items does not correspond to the predetermined number of items.

14. The system as defined in claim 13, wherein the computer-readable storage device stores further instructions which, when executed by the system, cause the system to perform operations comprising:
after returning the grasped items back to the container, retrieving second grasped items by repeating the operations of:
moving the manipulator through the open top of the container and grasping one or more other items in the container with the manipulator without any assistance from an individual or other mechanism, to yield the second grasped items;
moving the manipulator and the second grasped items to a position just above the open top of the container and remaining items in the container; and
moving the second grasped items to another area via the manipulator when a number of the second grasped items corresponds to the predetermined number of items.

15. A method comprising:
moving a manipulator through an open top of a container and grasping one or more items in the container with the manipulator without any assistance from an individual or other mechanism, to yield grasped items;
moving the manipulator and the grasped items to a position just above the open top of the container; and
moving the grasped items to another area when a number of the grasped items corresponds to a predetermined number of items.

16. The method as defined in claim 15, further comprising:
returning the grasped items back to the container when the number of items grasped by the manipulator does not correspond to the predetermined number of items.

17. The method as defined in claim 16, further comprising:
after returning the grasped items back to the container, retrieving second grasped items by repeating steps of:
moving the manipulator through the open top of the container and grasping one or more other items in the container with the manipulator without any assistance from an individual or other mechanism, to yield the second grasped items;
moving the manipulator and the second grasped items to a position just above the open top of the container and remaining items in the container; and
moving the second grasped items to another area via the manipulator when a number of the second grasped items corresponds to the predetermined number of items.

18. The method of claim 15, wherein the manipulator is associated with a mobile robot.

19. The method of claim 15, wherein the manipulator comprises at least one of a gripping device, a suction device, and electromagnet, a winch, or a clasp.

20. The method of claim 15, further comprising:
returning the grasped items back to the container when the number of items grasped by the manipulator does not correspond to the predetermined number of items.

* * * * *